Inventor:
Peter F. Gandolfo,
by Russell, Chittick & Pfund
Attorneys

Dec. 21, 1965     P. F. GANDOLFO     3,224,529
POWER SAFETY DEVICE FOR CARRIAGE CONTROLLED
MATERIAL HANDLING TRUCKS
Filed May 23, 1963     4 Sheets-Sheet 2
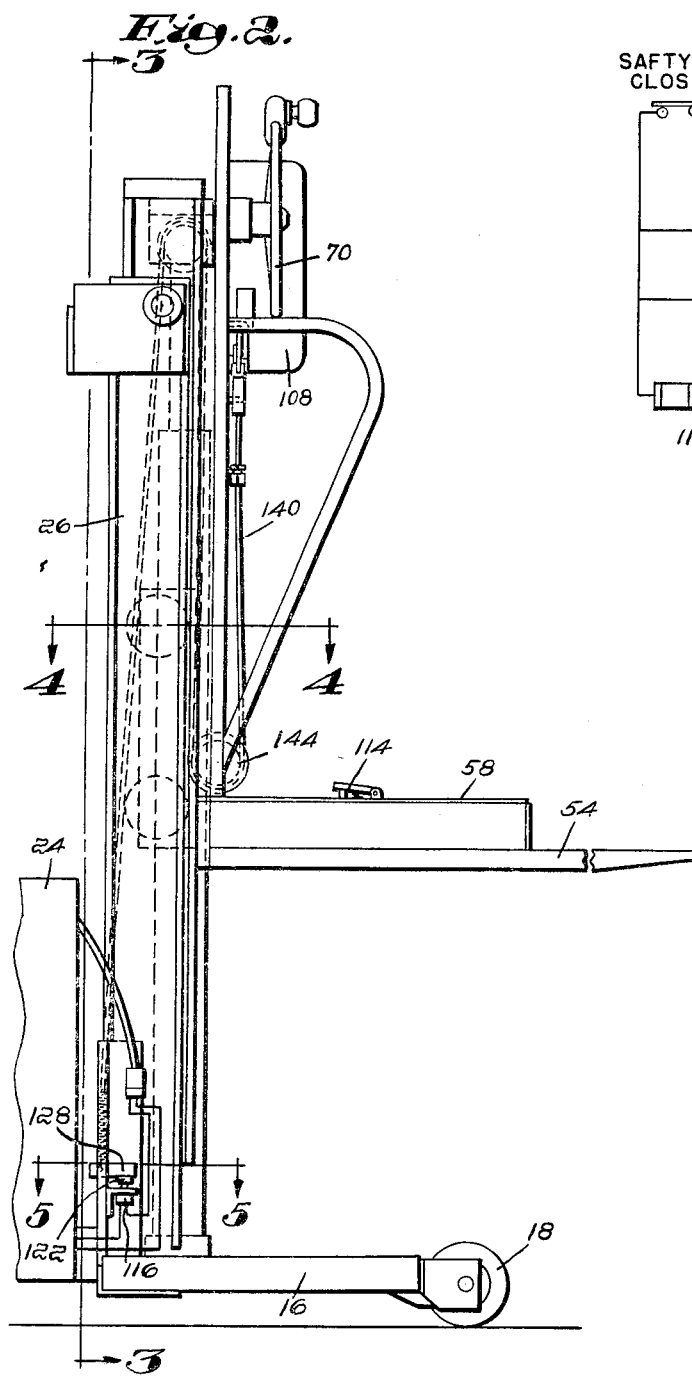
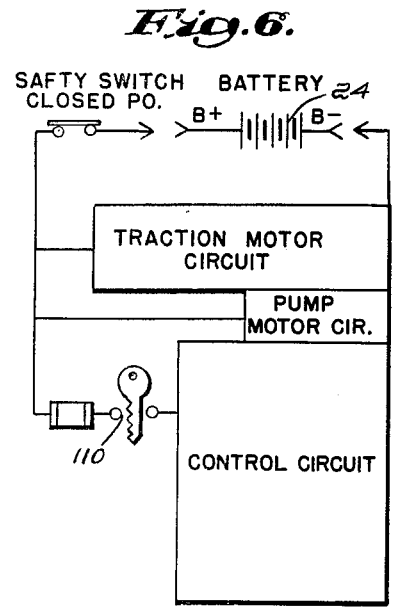
Inventor:
Peter F. Gandolfo,
by Russell, Chittick & Pfund
Attorneys Dec. 21, 1965          P. F. GANDOLFO                3,224,529
           POWER SAFETY DEVICE FOR CARRIAGE CONTROLLED
                      MATERIAL HANDLING TRUCKS
Filed May 23, 1963                              4 Sheets-Sheet 3
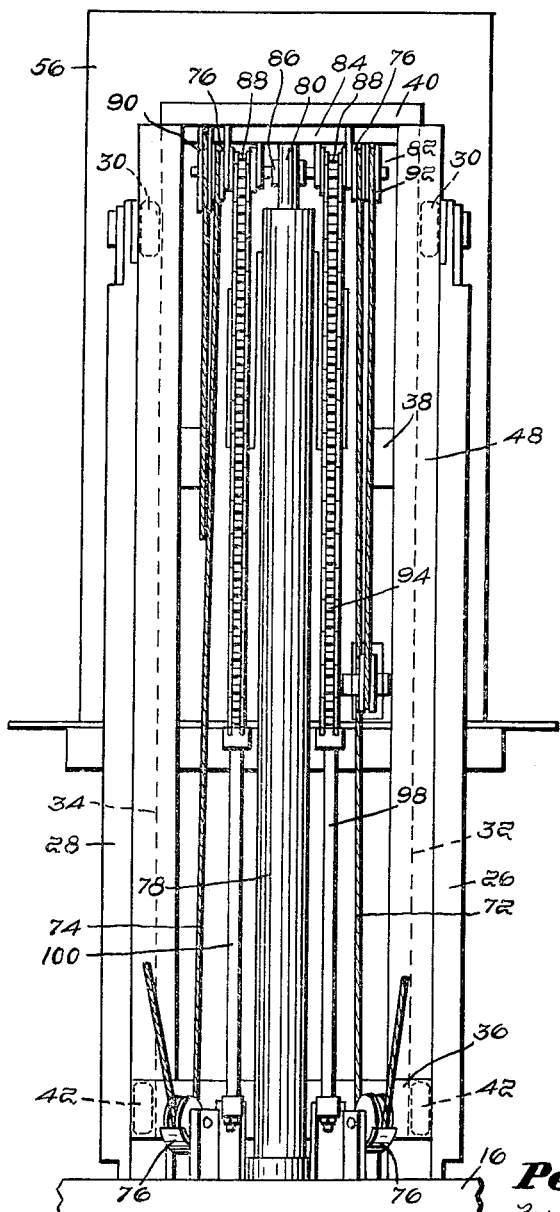
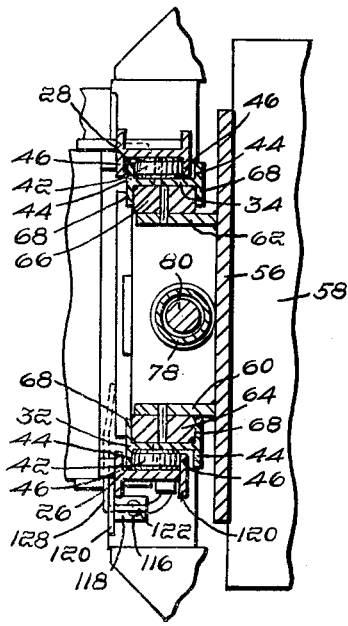
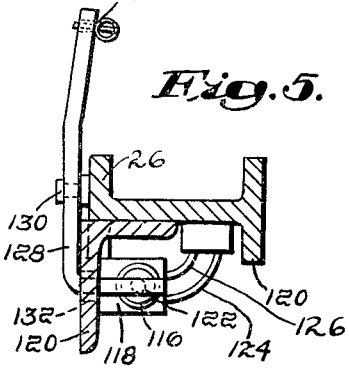
Inventor:
Peter F. Gandolfo,
by Russell, Chittick & Pfund
Attorneys

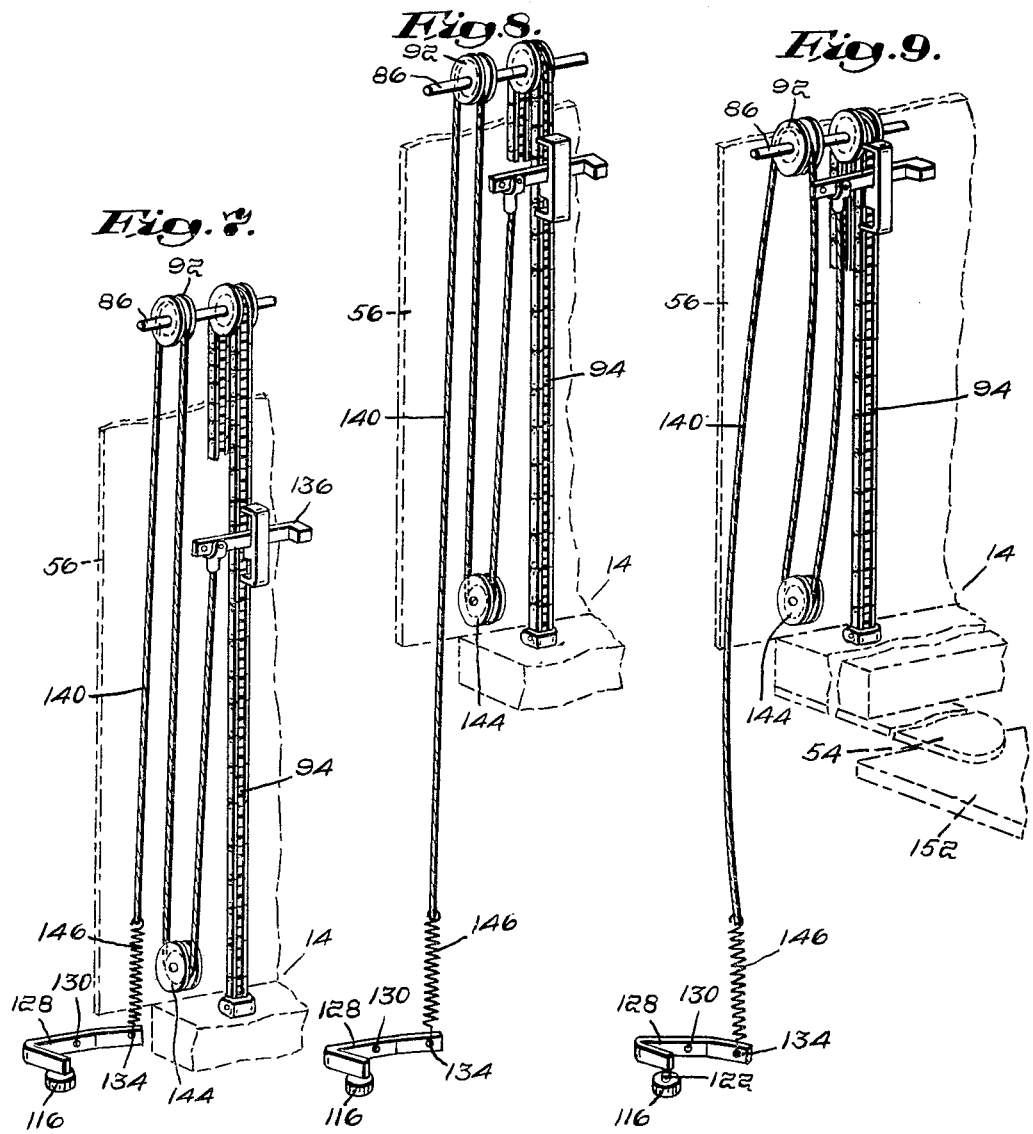

United States Patent Office 3,224,529
Patented Dec. 21, 1965

3,224,529
POWER SAFETY DEVICE FOR CARRIAGE CONTROLLED MATERIAL HANDLING TRUCKS
Peter F. Gandolfo, Wellesley, Mass., assignor to Lewis Shepard Company, Watertown, Mass., a corporation of Massachusetts
Filed May 23, 1963, Ser. No. 282,671
3 Claims. (Cl. 182—14)

This invention relates to carriage controlled material handling trucks and more particularly to a power safety device for use therewith.

Continuing improvements in material handling techniques and equipment have led to a more efficient utilization of personnel and storage space in commercial and industrial storerooms, warehouses, etc. One such improvement is evidenced by the development of the high-lift, carriage controlled material handling truck. This truck is comprised essentially of a mobile truck base having upwardly disposed masts carrying a carriage assembly capable of vertical displacement in relation thereto. The carriage assembly is raised and lowered by an elevating mechanism comprised of a hydraulic cylinder and lifting chains and is further provided with outwardly extending loading forks, a platform on which an operator may stand and a control panel. The control panel is in turn provided with means for simultaneously controlling both the horizontal movement of the mobile truck base through the use of a steering wheel and steering cables and the vertical displacement of the carriage assembly by controlling said elevating mechanism.

Several significant advantages result from this arrangement. By enabling an operator to raise or lower himself through a substantial vertical distance, goods may be more efficiently stored on higher shelves or stacks, thereby providing for more efficient use of valuable floor space in storerooms and warehouses. In addition, by enabling an operator to place both himself and the loading forks in close proximity to the shelf or stack, a better view is provided for the operator when placing the forks under a palet. Furthermore, the ability of an operator positioned on the platform to simultaneously guide the mobile truck base in its horizontal movement while vertically displacing both himself and the carriage assembly provides for considerable savings in time when moving from shelf to shelf or stack to stack and thereby results in a more efficient warehouse operation.

Although carriage controlled material handling trucks have proved highly successful and are currently being extensively utilized, several problems in personnel safety have remained unsolved. More specifically, during the movement of the carriage assembly from a higher shelf to a lower shelf, the outwardly extending loading forks may sometimes become accidentally engaged on said upper shelf. When this occurs, the downward movement of the carriage is momentarily interrupted. However, the elevating mechanism of the carriage may continue to descend. Consequently, when the loading forks finally become disengaged from the shelf, the carriage assembly may fall through a considerable distance before again coming into contact with the elevating mechanism. This rapid descent of the carriage assembly and sudden stop when finally engaged by the elevating mechanism may impart a severe shock to the operator standing on the platform, causing him to loose his balance and fall from the carriage. Moreover, when the carriage remains engaged on the shelf while the elevating mechanism continues to descend, lifting chains and steering cables may jump their respective sheaves and pulleys, rendering it impossible for the operator to subsequently reactivate the elevating and steering mechanisms in order to disengage the carriage from the shelf.

Another danger found in the operation of carriage controlled material handling trucks currently in use is the inability of an operator to quickly stop all movement of both the mobile truck base and the carriage assembly when an emergency arises. For example, should a malfunction occur in one of the numerous switches and relays which comprise the various control systems, the operator should be provided with an overriding quick-release safety switch which may be quickly opened in order to interrupt the power supply to all electrical circuits. In this manner, an operator would be able to quickly and efficiently bring all movement of the truck to a complete halt in order to acquire sufficient time to determine the cause of the malfunction or the source of the difficulty and then take the necessary steps to correct the problem. The need for a safety switch of this type becomes more acute where the operator is controlling the movement of the truck from an elevated carriage and where collision of the truck with some stationary object could cause him to fall through a considerable distance.

Accordingly, an object of the present invention is to provide a quick-release safety switch connected in series between the power supply of said truck and its control circuits, operable from the carriage assembly of a carriage controlled material handling truck and thereby providing an operator positioned on said carriage assembly with a means for quickly and safely stopping all movement of the carriage and mobile truck base when an emergency arises.

Another object of the present invention is to provide a means for quickly and automatically arresting the descent of the elevating mechanisms when the carriage assembly becomes accidentally engaged on a shelf or rack during its downward movement.

These and other objects of the present invention will become more apparent as the description proceeds with the aid of the accompanying drawings in which:

FIG. 2 is a view in side elevation of a carriage controlled material handling truck showing the carriage raised to an intermediate position with the extensible telescoping masts partially extended;

FIG. 3 is a sectional view in elevation taken along lines 3—3 of FIG. 2;

FIG. 4 is a sectional plan view taken along line 4—4 of FIG. 2.

FIG. 5 is an enlarged sectional plan view taken along line 5—5 of FIG. 2 in order to illustrate the means of mounting and actuating the button operated safety swicth;

FIG. 6 is a circuit diagram illustrating the means of connecting the switch in relation to the battery power supply of the truck and the various control sub-circuits;

FIG. 7 is a perspective schematic diagram illustrating the relationship of a lifting chain to the safety switch cable where the carriage assembly is in a lowered position;

FIG. 8 is a view similar to FIG. 7 showing the carriage assembly raised to an intermediate position; and FIG. 9 is a view similar to FIGS. 7 and 8 where the loading forks extending outwardly from the carriage assembly have become accidentally engaged on a shelf or rack during downward displacement of the carriage assembly.

Figure 1:
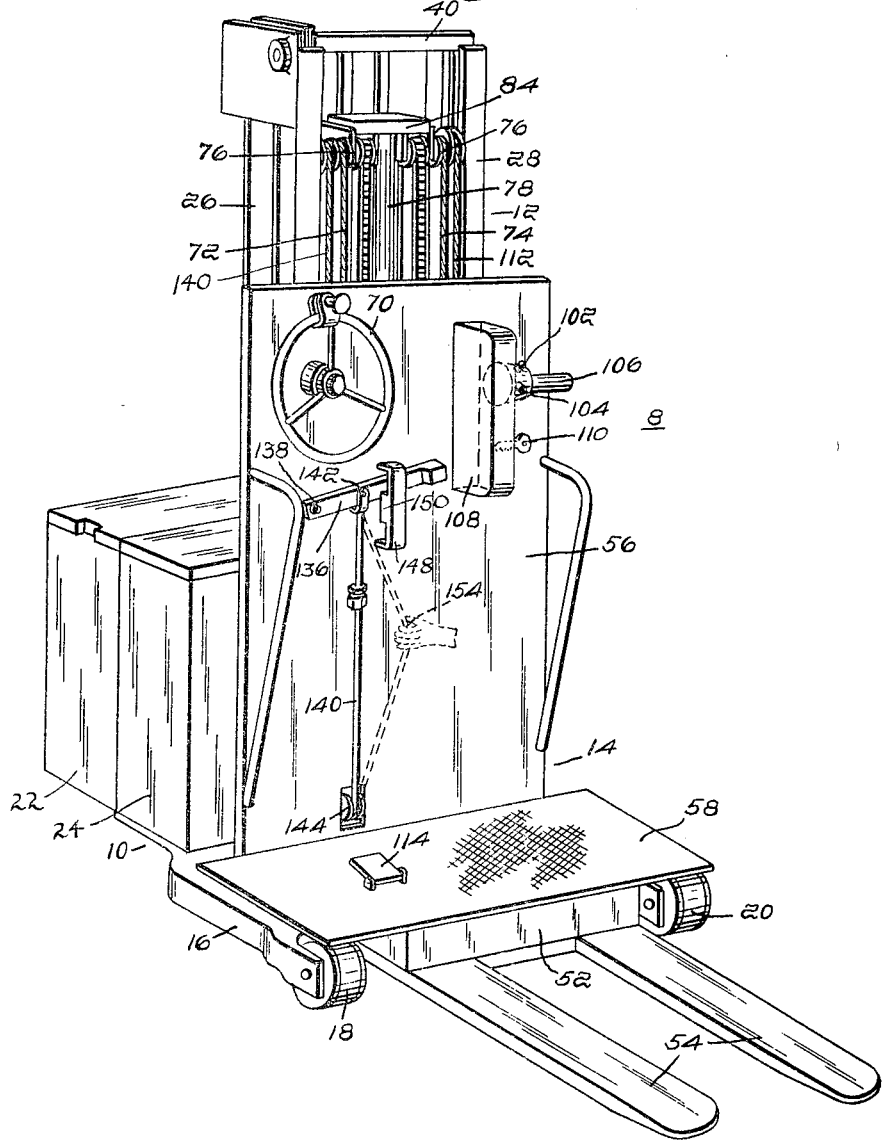
FIG. 1 is a view in perspective of a carriage control material handling truck embodying applicant's power safety device.

Before proceeding with a detailed description of the applicant's power safety device, a description of the conventional carriage controlled material handling truck upon which the device is utilized will first be provided. Although the conventional carriage controlled material handling truck illustrated in the drawings is of the high-lift type having extensible telescoping masts, it should be noted that applicant's device can also be used with trucks having non-telescoping masts.

Referring now to FIG. 1, a carriage controlled material handling truck generally indicated at 8 is shown comprising a mobile truck base 10 having a vertical extensible mast assembly 12 extending upwardly therefrom and a carriage assembly 14 movably mounted thereon. Mobile truck base 10 is comprised of a bifurcated frame 16 having load wheels 18 and 20 rotatably mounted thereon and a single drive wheel (not shown). A housing 22 containing the drive unit, electrical panels and hydraulic system is mounted on frame 16 together with a removably mounted rechargeable electrical storage battery 24.

The vertical extensible mast assembly generally indicated at 12 in FIG. 1 will now be described with particular reference to FIGS. 3 and 4. Spaced outer masts 26 and 28 comprised of vertically disposed longitudinal I-beams are provided at their upper extremities with rotatably mounted inwardly disposed guide wheels 30 and are fixed at their lower extremities to frame 16. Spaced inner masts 32 and 34 comprised of vertically disposed I-beams are interconnected by horizontal bracing members 36 and 38 and 40 to form an inner frame positioned between the outer masts. A second pair of outwardly disposed lower guide wheels 42 are provided at the lower extremity of inner masts 32 and 34. As can be seen in FIG. 4, the outwardly disposed webs 44 of inner masts 32 and 34 overlap the inwardly disposed webs 46 of outer masts 26 and 28 to form longitudinal channels 48 and 50 within which said upper and lower pairs of guide wheels 30 and 42 may travel. Thus it can be seen that the inner masts can be telescopically displaced within the stationary outer masts with the upper and lower guide wheels cooperating with channels 48 and 50 to guide said movement.

The carriage assembly generally indicated at 14 will now be described with reference to FIGS. 1 and 4. Platform base 52 having loading forks 54 extending outwardly therefrom is provided with a vertically disposed rear panel 56 and a horizontal standing platform 58. Rear panel 56 is in turn provided at its rear surface with vertically disposed roller bearing supports 60 and 62 having rotatably mounted thereon outwardly disposed roller bearings 64 and 66. As can be seen in FIG. 4, roller bearings 64 and 66 are positioned to ride between the inwardly disposed webs 68 of inner masts 32 and 34 and thereby guide the carriage assembly during its vertical displacement with respect to the inner masts. Thus it can be seen that the inner masts 32 and 34 can be vertically displaced with respect to the outer masts 26 and 28 in an extensible telescoping fashion, and the carriage assembly vertically displaced with respect to the inner masts, thereby providing dual means for promoting vertical displacement of the carriage.

Rear panel 56 is further provided with control mechanisms for controlling the operation of the material handling truck. A steering wheel 70 is rotatably mounted on panel 56 and operatively connected through steering cables 72 and 74 and steering cable pulleys 76 to the single drive wheel (not shown) pivotally mounted beneath housing 22. Rotation of steering wheel 70 by the operator standing on platform 58 will cause the drive wheel to pivot, thereby providing the operator with a means of steering the mobile truck base.

Vertical displacement of the carriage assembly 14 is accomplished by controlling the flow of hydraulic fluid to vertically disposed hydraulic cylinder 78 positioned between inner masts 32 and 34 and containing extensible piston rod 80. Piston rod 80 terminates at its upper extremity in a lifting head assembly generally indicated at 82 and comprising a horizontal ram head 84, and a horizontal shaft 86 having lifting chain idlers 88, steering cable pulleys 76, a control cable pulley 90 and a safety switch cable pulley 92 rotatably mounted thereon.

Lifting chains 94 and 96 are attached at one extremity to chain anchors 98 and 100 in turn attached to frame 16 and extend over chain idlers 88 to be attached at their other extremity to the carriage assembly 14. Thus it can be seen that by actuating the hydraulic pump contained within housing 22 and injecting hydraulic fluid into cylinder 78, piston rod 80 will be raised carrying with it lifting head assembly 82. As the lifting head assembly is raised, the length of lifting chains 94 and 96 between the chain idlers 88 and their point of attachment to the carriage movable assembly 14 is constantly diminished. This in turn results in a raising of the carriage assembly in a 2–1 ratio with respect to the vertical displacement of piston rod 80.

The means of controlling the flow of hydraulic fluid into cylinder 78 by actuating the hydraulic pump and valve system contained within housing 22 and the means of controlling the driving power to be delivered to the single drive wheel positioned thereunder will now be described. Button switches 102 and 104 are provided on control handle 106 which extends outwardly from control box 108 on panel 56. An on-off key-controlled switch 110 is also provided at control box 108. These switches and handle are connected through control cable 112 which extends over control cable pulley 90 to the hydraulic and drive control circuits in housing 22. By pressing either button switch 102 or 104, the flow of hydraulic fluid to cylinder 78 is controlled and the platform 58 raised or lowered. Rotation of handle 106 in either a clockwise or counter-clockwise direction will control the direction of rotation of the drive wheel and hence the direction of movement of the mobile truck base. Thus it can be seen that by operating switches 102 and 104 and handle 106, and by steering with steering wheel 70, an operator standing on platform 58 can control both the vertical displacement of the carriage and the horizontal movement of the mobile truck base.

As can be seen in FIG. 3, a short vertical distance exists between the upper surface of horizontal ram head 84 and the lower surface of horizontal bracing member 40 when the piston rod 80 is in its lowered position. Consequently, as fluid is injected into cylinder 78 causing piston rod 80 to rise, horizontal ram head 84 will travel through said above-mentioned distance before engaging bracing member 40. Consequently, the inner masts will not be raised with respect to the outer masts until this point of engagement is reached, at which time further extension of the piston 80 will result in the simultaneous vertical displacement in an upward direction of both the carriage assembly 14 with respect to the inner masts 32 and 34 and in addition, the inner masts with respect to the outer masts 26 and 28.

A brake release 114 is provided as a safety device in order to prevent accidental movement of the mobile truck base. In order to move the truck in a horizontal direction, the operator must not only operate switches 102 and 104 but must also press brake release 114.

Having thus described the principal components and methods of operation of a standard carriage controlled material handling truck, the discussion will now proceed with a description of applicant's emergency stop device. As can be seen from FIGS. 1, 2 and 5, the device is comprised of a button-operated switch 116 mounted on plate 118 in turn attached to outer mast 26 between an outwardly disposed web 120. Switch 116 is closed by depressing button 122 and opened by simply releasing any pressure exerted thereon.

As can be seen in FIG. 6, switch 116 is connected in series between the truck's battery power supply 24 and the traction motor circuit, pump motor circuit and control circuit through wire leads 124 and 126 (shown in FIG. 5). Thus, when key switch 110 is closed and pressure exerted on button 112 to close safety switch 116, the electrical circuit is completed and power is supplied to all sub-circuits in order to make normal operation of the truck possible. By releasing pressure on button 122, switch 116 is immediately opened, interrupting the power supply to all sub-circuits and thereby effectuating a complete stoppage of all truck and carriage movement.

The method of controlling the pressure exerted on button 122 in order to open or close switch 116 will now be discussed. As can be seen in FIG. 5, an L-shaped lever 128 is pivotally mounted on outer mast 26 as at 130, and extends at a right angle through aperture 132 with one extremity positioned directly over button 122. Thus it can be seen that by exerting an upward force on lever 128 at its other extremity as at 134, a downward force is exerted on button 122, resulting in the closing of switch 116.

The application or release of the upward force on lever 128 at 134 is accomplished by the operation of handle 136 pivotally mounted as at 138 on rear panel 56. Handle 136 is operatively connected to lever 128 through safety switch cable 140 attached at one extremity to the handle as at 142 and extending downwardly to intermediate pulley 144 mounted at the lower edge of panel 56. As can be seen from FIGS. 7–9 together with FIG. 1, safety switch cable 140 then passes around intermediate pulley 144 and upwardly to pulley 92 rotatably mounted on shaft 86 of lifting head assembly 82, from whence it again passes downwardly to be finally connected at its other extremity to spring 146 in turn connected to lever 128 as at 134. Thus it can be seen that by raising handle 136, spring 146 is placed in tension resulting in turn in an upward force being exerted on lever 128 as at 134 and a downward force being exerted on button 122 of switch 116. Bracket 148 having an inwardly disposed shoulder 150 is provided in order to maintain handle 136 in an upward position during normal operation of the truck. Should an operating emergency occur, the operator need only strike handle 136 a sharp blow in a direction perpendicular to the plane of rear panel 56. In this manner, handle 136 will be dislodged from shoulder 150 and will fall to a lowered position. This in turn will cause spring 146 to collapse and result in a release of the pressure being exerted on button 122 by lever 128.

As can be seen in FIGS. 7–9, safety switch cable 140 extends co-extensively with lifting chain 94 (or 96). FIG. 7 shows the positional relationship of safety switch cable 140 to lifting chain 94 when the carriage assembly is in its lowered position. FIG. 8 is an illustration similar to FIG. 7 showing the carriage assembly raised to an intermediate position by the upward displacement of piston 80. Although the carriage has been displaced to a higher position, both the safety switch cable 140 and the lifting chain 94 remain taught, thereby resulting in a constant upward force on lever 128 as at 134 and an accompanying constant pressure on safety switch button 122. Thus, it can be seen that regardless of the vertical position of the carriage assembly 14, without any operation of handle 136 by an operator, tension will remain in safety switch cable 140 as long as lifting chain 94 is in tension.

An important advantage results from this relationship. As previously mentioned, during the operation of conventional carriage controlled material handling trucks, vertical displacement of the carriage during normal operation of the truck between stacks or shelves sometimes results in the outwardly disposed lifting forks 54 becoming accidentally engaged on a shelf or stack. When this occurs, downward displacement of the carriage assembly is momentarily retarded. However, if the operator becomes confused or is not quick enough to sense the situation and stop all motion of the truck, serious consequences can result.

Although the forks remain engaged on the shelf, piston 80 carrying cross-head assembly 82 may continue to descend. Should this occur, slack will immediately begin to develop in lifting chains 94 and 96, steering cables 72 and 74, and power control cable 112. As the piston continues to drop and more slack develops, the chains and cables may jump off their respective pulleys and idlers. Should this occur, although the operator will still be able to stop further descent of the piston by releasing pressure on switches 102 or 104, he will be unable to subsequently raise the piston to disengage the forks 54 from the shelf since the lifting chains have now jumped their respective pulleys.

Furthermore, should the operator succeed in disengaging the forks from the shelf or stack by movement of the mobile truck base, the carriage will then fall abruptly until tension is again developed in lifting chains 94 and 96. This abrupt fall may cause the operator to lose his balance and fall from the carriage platform.

These dangerous possibilities are effectively and automatically avoided through the use of applicant's emergency stop device. As previously mentioned, safety switch control cable 140 extends co-extensively with lifting chains 94 and 96. Consequently, as soon as slack develops in the lifting chains, a corresponding slack automatically develops in the control cable. Thus, as can be seen in FIG. 9, where the forks 54 become engaged on a shelf or stack 152 during downwardly displacement of the carriage assembly 14, slack is created simultaneously in both switch cable 140 and lifting chain 94, as previously mentioned.

Slack in switch cable 140 causes safety switch 116 to open immediately, interrupting the flow of current from battery 24 to all sub-circuits. This in turn automatically prevents further escape of hydraulic fluid from cylinder 78 and results in further downward movement of piston 80 being arrested after only a very slight displacement. Thus, steering cables 72 and 74, lifting chains 94 and 96 and control and switch cables 112 and 140 are prevented from jumping their respective pulleys and idlers. Furthermore, should the carriage assembly become accidentally dislodged from the shelf 152 before the operator can actuate cylinder 78 and raise piston 80, it will fall through only a slight distance before tension is again developed in lifting chains 94 and 96.

Once the operator has reviewed the situation and determined that the downward displacement of the carriage has been interrupted because of its accidental engagement on a stationary object, he can then proceed to re-actuate the lifting mechanism and disengage the carriage assembly in an orderly manner. This is done by manually grasping safety switch cable and pulling it in a lateral direction as indicated in FIG. 1 at 154. In so doing, safety switch cable 140 is again placed in tension, resulting in a pressure being exerted on safety switch button 122. Then, by actuating the hydraulic pump and forcing fluid into cylinder 78, piston 80 can be raised in order to place the lifting chains in tension and lift the carriage from the shelf.

It is my intention to cover all changes and modifications of the example of the invention chosen for purposes of disclosure which do not constitute departures from the spirit and scope of the invention.

I claim:

1. For use on a carriage controlled material handling truck of the type having a mobile base with a mast assembly extending upwardly therefrom and a carriage movable vertically on said mast assembly under the influence of lifting apparatus operatively connected thereto, an emergency stop device operable from the carriage of said truck for enabling an operator positioned thereon to quickly and efficiently stop all movement of said truck should an operating emergency arise, said emergency stop device comprising: a button-operated switch of the type closed by pressure exerted on said button and opened by release of pressure thereon; means manually operable from said carriage and extending co-extensively with the lifting apparatus of said truck for maintaining pressure on said button during normal operation of said truck, said means capable of automatically releasing pressure on said button in the event that downward vertical movement of said carriage on said mast assembly is accidentally interrupted.

2. A carriage controlled material handling truck comprising the combination of: a mobile truck base having spaced vertical masts extending upwardly therefrom; a carriage assembly movable vertically on said spaced vertical masts; a power source contained within said truck base; elevational means powered by said power source for vertically displacing said carriage assembly; drive means powered by said power source for propelling said mobile truck base; steering means co-extensive with said elevational means and operable from said carriage assembly for guiding said mobile truck base; an emergency stop device comprising a normally open button switch positioned on said mobile truck base and connected in series between said power source and said elevational and drive means; and a control means manually operable from said carriage and co-extensive with said elevational and steering means for maintaining said switch in a closed position during normal operation of said material handling truck and for opening said switch in order to disconnect said power source during operating emergencies requiring a complete stoppage of said drive and elevational means, said control means automatically operable to open said switch when downward movement of said carriage assembly on said masts is inadvertently interrupted.

3. A carriage controlled material handling truck comprising the combination of: a mobile truck base having spaced vertical masts extending upwardly therefrom; a carriage assembly comprising an operator's platform, a control panel and a load carrying means extending outwardly therefrom, said carriage assembly movably mounted on said spaced vertical masts for vertical displacement thereon; a power source contained within said truck base; elevational means for vertically displacing said carriage assembly comprising a vertically disposed hydraulic cylinder having an axially disposed extensible piston contained therein, the upper extremity of said piston terminating in a lifting head assembly comprised of a horizontal ram head and a horizontally disposed shaft, said shaft having chain idlers, steering pulleys, a control cable pulley and a safety switch cable pulley rotatably mounted thereon; lifting chains having one extremity attached to said truck base and passing over said chain idlers, the other extremity of said chains attached to said carriage assembly in order to provide a means of vertically displacing said carriage assembly by extending or retracting said piston; pump means powered by said power source for controlling the flow of hydraulic fluid into said cylinder in order to extend or retract said piston; steering means operable from said control panel for guiding said mobile truck base during horizontal movement thereof, said steering means including steering cables passing over said steering pulleys in co-extensive relationship with said lifting chains; drive means powered by said power source for propelling said mobile truck base; and an emergency stop device comprising the combination of a normally open button operated safety switch positioned on said mobile truck base, said switch connected in series intermediate said power source and said elevational and drive means, a switch lever pivotally mounted on said truck and having one extremity in contact with said button switch, the other extremity of said lever switch connected to a safety switch cable, said safety switch cable passing over said safety switch cable pulley in a co-extensive relationship with said lifting chains and said steering cables, the other extremity of said control cable attached to an operating lever on said control panel, said control cable held in tension during normal operation of said truck by manual adjustment of said operating lever in order to raise one extremity of said pivotally mounted switch lever and thereby maintain said switch in a closed position by exerting a pressure thereon, said switch capable of being manually opened from said carriage by operating said control lever to remove the tension from said cable, said switch automatically opened when slack develops in said control cable as a result of an accidental interruption in the downward movement of said carriage assembly on said masts.

References Cited by the Examiner
UNITED STATES PATENTS

| | | | |
|---|---|---|---|
| 1,848,972 | 3/1932 | Peebles | 254—175 |
| 2,561,576 | 7/1951 | Johnson | 187—9 |
| 2,997,721 | 8/1961 | Hopfeld | 182—14 |
| 3,016,973 | 1/1962 | Williamson | 182—14 |
| 3,095,945 | 7/1963 | Mitchell | 182—14 |
| 3,099,332 | 7/1963 | Marco et al. | 182—14 |

SAMUEL F. COLEMAN, *Primary Examiner.*

ERNEST A. FALLER, *Examiner.*